US005985338A

United States Patent [19]
Suh et al.

[11] Patent Number: 5,985,338
[45] Date of Patent: Nov. 16, 1999

[54] PLANT PROTEIN FOR NUTRITIONAL PRODUCTS AND METHOD OF MAKING SAME

[75] Inventors: John D. Suh, Gahanna; Karin M. Ostrom, Reynoldsburg; Louis I. Ndife, Columbus; Paul S. Anloague, Reynoldsburg; James N. Chmura, Canal Winchester; Andre Daab-Krzykowski; Paul W. Johns, both of Columbus; Diane M. Garcia, Westerville; Terrence B. Mazer, Reynoldsburg; Fu-I Mei, Columbus, all of Ohio

[73] Assignee: Abbott Laboratories, Abbott Park, Ill.

[21] Appl. No.: 09/163,493

[22] Filed: Jun. 30, 1998

Related U.S. Application Data

[62] Division of application No. 08/713,904, Sep. 13, 1996, Pat. No. 5,804,234.

[51] Int. Cl.$^6$ ............................... A23K 1/02; A23L 1/30; A23L 1/00
[52] U.S. Cl. ........................... 426/69; 424/195.1; 426/48; 426/49; 426/72; 426/545; 426/546; 426/585; 426/590; 426/598; 426/601; 426/615; 426/629; 426/801; 514/27; 514/45; 514/46; 514/47; 514/48; 514/456
[58] Field of Search ..................................... 426/590, 598, 426/615, 629, 601, 585, 801, 69, 72, 545, 546, 48, 49; 514/27, 45, 46, 47, 48, 456; 424/195.1

[56] References Cited

U.S. PATENT DOCUMENTS

| | | |
|---|---|---|
| 4,990,344 | 2/1991 | Euber et al. ............................ 426/801 |
| 5,021,245 | 6/1991 | Borschel et al. . |
| 5,248,804 | 9/1993 | Nardelli et al. . |
| 5,352,384 | 10/1994 | Shen . |
| 5,492,899 | 2/1996 | Masor et al. . |
| 5,506,211 | 4/1996 | Barnes et al. . |
| 5,670,632 | 9/1997 | Chaihorsky . |

FOREIGN PATENT DOCUMENTS 0 575 121A  12/1993  European Pat. Off. .

OTHER PUBLICATIONS

Scientific American, pp. 103–105, Mar., 1995.
Collipp, et al., Manganese in Infant Formulas and Learning Disability, *Ann. Nutr. Metab.*, 1983, 27:488–494.
Ha, et al., Isoflavone Aglucones and Volatile Organic Compounds in Soybeans; Effects of Soaking Treatment, *Journal of Food Science*, vol. 57, No. 2, 1992.
How and Morr, Removal of Phenolic Compounds from Soy Protein Extracts Using Activated Carbon, *Journal of Food Science*, vol., 47, pp. 933–940, 1982.
Lundh, Conjugation of the Plant Estrogens Formononetin and Daidzein and Their Metabolite Equol by Gastrointestinal Epithelium from Cattle and Sheep, *J. Agric. Food Chem.*, pp. 1012–1016, Jan., 1982.

Murphy, Phytoestrogen Content of Processed Soybean Products, *Food Technology*, pp. 60–64, Jan., 1982.
Middleton and Kandaswami, Potential Health–Promoting Properties of Citrus Flavonoids, *Food Technology*, pp. 115–119, Nov., 1994.
Setchell and Welsh, High–Performance Liquid Chromatographic Analysis of Phytoestrogens in Soy Protein Preparations with Ultraviolet, Electrochemical and Thermospray Mass Spectrometric Detection (erroneously referred to in the specification as Naturally Occuring Non–Steroidial Estrogens of Dietary Origin), *J. Chrom.*, 386, pp. 315–323, 1987.
McLachlan, Estrogens in the Environment II, New York Elsevier Press, pp. 69–85, 1985.
Setchell, et al., Nonsteroidal Estrogens of Dietary Origin: Possible Roles in Hormone–Dependent Disease, *Am. J. Clin. Nutr.*, 40:569–578, 1984.
Adlercreutrz, et al., Determination of Urinary Lignans and Phytoestrogen Metabolites, Potential Antiestrogens and Anticarcinogens, in Urine of Women on Various Habitual Diets, *J. Steroid Biochem*, 25:791–797, 1986.
Abstract of Japanese Patent Application No. 06 276955 A Apr. 04, 1994 Akira.
Database FSTA, 80–1–06–GO409, 1980, XP002051365, Staron T. and Guillman R: A method for extracting rapeseed protein and oil by water.
Barnes, S., et al., "Isoflavones and their conjugates in soy foods: Extraction conditions and analysis by HPLC–Mass spectrometry," *Journal of Agricultural and Food Chemistry*, vol.. 42, 1994, pp. 2466–2474.
Huang A–S, et al., "Characterization of the nonvolatile minor constituents responsible for the objectionable taste of defatted soybean flour," *Journal of Food Science*, vol. 47, 1981, pp. 19–23.
Kaldas and Hughes, Reproductive and General Metabolic Effects of Phytoestrogens in Mammals, *Reproductive Toxicology*, vol.. 3, pp. 81–89, 1989.
Setchell, et al., Dietary Estrogens—A Probable Cause of Infertility and Liver Disease in Captive Cheetahs, *Gastroenterology*, 93:225–233, 1987.
Gottschalk, et al., Abnormalities in Hair Trace Elements as Indicators of Aberrant Behavior, *Comprehensive Psychiatry*, vol.. 32, No. 3 (May/Jun.), 1991: pp. 229–237.

*Primary Examiner*—Herbert J. Lilling
*Attorney, Agent, or Firm*—J. Michael Dixon; Thomas D. Brainard

[57] ABSTRACT

The present invention relates generally to a method of producing plant proteins for use in nutritional products that have reduced levels of phytoestrogens, manganese or nucleotides. More specifically, this invention is directed to a method of using ion exchange technology to remove phytoestrogens, manganese or nucleotides from plant proteins. This invention is also directed to the plant protein product resulting from the inventive process and to nutritional products that use the plant protein product as a source of amino nitrogen.

40 Claims, No Drawings

PLANT PROTEIN FOR NUTRITIONAL PRODUCTS AND METHOD OF MAKING SAME

This application is a divisional of application Ser. No. 08/713,904 filed Sep. 13, 1996, now U.S. Pat. No. 5,804,234.

RELATED CASES

This application is related to co-pending application Ser. No. 08/710,236, filed Sep. 13, 1996, entitled PROCESS FOR ISOLATING PHYTOESTROGENS FROM PLANT PROTEIN. The teachings of that patent application are herein incorporated by reference.

FIELD OF THE INVENTION

The present invention relates generally to a method of purifying plant proteins for use in nutritional products that have reduced levels of phytoestrogens, manganese and nucleic acids. More specifically, this invention is directed to a method of using ion exchange technology to remove phytoestrogens, manganese, nucleotides, nucleosides and RNA from plant proteins. This invention is also directed to the plant protein product resulting from the inventive process and to nutritional products that use the plant protein product as a source of amino nitrogen.

BACKGROUND OF THE INVENTION

Phytoestrogens or plant estrogens occur in a variety of plants, including vegetable protein materials such as those derived from soybeans. Phytoestrogens are defined as plant substances that are structurally and functionally similar to the gonadal steroid 17 β-estradiol or that produce estrogenic effects. There are three main groups of nonsteroidial dietary estrogens which are 1) the isoflavones, 2) the coumestans and 3) the mycoestrogens (fungal). The structural similarity between these substances and the endogenous mammalian estrogens have been studied. A review of phytoestrogens and their effects in mammals is reported by Kaldas and Hughes in an article entitled, "Reproductive and General Metabolic Effects of Phytoestrogens in Mammals", *Reproductive Toxicology*, Vol. 3, pp. 81–89, 1989. The teachings of this article are herein incorporated by reference. As used in this specification and the appended claims, the term "isoflavones" is equivalent to the term "phytoestrogens" as that term is defined in the Kaldas et al. article. Representative of the isoflavones that are reduced in plant proteins in accordance with the present invention are daidzein, daidzin, genistein and genistin.

Flavonoids and isoflavones are produced by numerous leguminosoe and grasses, including many plants commonly consumed by man and livestock. Soy isoflavones include compounds such as daidzin, genistin, daidzein and genistein. A general structural formula for these compounds is:

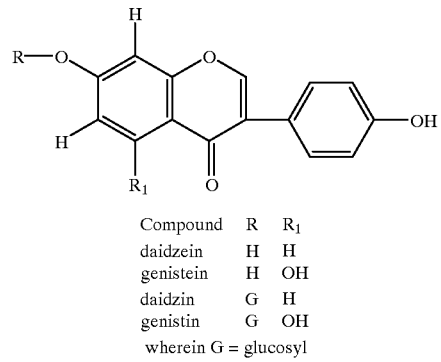

| Compound | R | $R_1$ |
|---|---|---|
| daidzein | H | H |
| genistein | H | OH |
| daidzin | G | H |
| genistin | G | OH | wherein G = glucosyl

It has recently been recognized that isoflavones contained in vegetable proteins may have a detrimental impact upon the mammals that consume the vegetable protein, see Kaldas et al., supra. The concentration of isoflavones in plant protein isolates or concentrates such as soy protein isolates, can be as high as 3,000 μg/g of protein. Isoflavones also provide the bitter or "beany" taste to vegetable proteins, (see Ewan et al. infra) may reduce the bioavailability of essential minerals and may influence the nutritional value of proteins (see Kaldas et al., supra). The consumption of isoflavones by man and livestock has also been connected with compromised reproductive systems in mammals. There is some concern that consumption of current soy based infant formulas that contain soy isoflavones may have an undesired physiological impact on the developing neuro-endocrine system of the infant. This concern is based in part, on evidence that soy-based animal feed may cause fertility problems in cheetahs. Setchell et al., 1987: "Gastroenterology" 93:225–33.

Further, the presence of high levels of manganese in body tissues has been suspected in the development of criminal behavior. See Gottschalk et al., "Abnormalities in Hair Trace Elements as Indicators of Aberrant Behavior", *Compr Psychiatry* 1991; 32:229–237, and *Scientific American*, March, 1995 pp. 104–105. Furthermore, there have also been reports that learning disabilities in children may be associated with increased levels of manganese in hair as reported by Collipp et al., in an article entitled, "Manganese in Infant Formula and Learning Disabilities", *Ann. Nutritional Metals*, 27:488–494, 1983. Typical plant protein isolates contain up to 1000 μg of manganese per gram of protein. Thus, there is a need for improved processes that economically and on a commercial scale, provide for the reduction of isoflavone and manganese content in plant protein.

The use of nucleotides and nucleosides (or nucleotide equivalents as defined below) in nutritional formulas has received much attention in the last few years. It has been suggested that certain levels and ratios of the various nucleic acids can have a positive impact on the mammalian immune system and even prevent certain maladies such as diarrhea. The problem with using plant protein in such nutritional formulas is that the plant protein contains typically very high, inherent level of nucleic acids that may not be in the correct form (i.e., RNA) and at the correct ratios. Further, the high level of variation in the nucleic acid content causes problems in commercial manufacture. Typical plant protein isolates contain up to about 15 mg of nucleotide equivalents per gram of protein. Thus, the nutritional industry desires a source of plant protein that has substantially reduced levels of inherent nucleic acids. One additional benefit to the process of this invention is that, not only can the isoflavones and manganese be removed by the ion exchange column but also a substantial portion of the inherent nucleic acids.

Ion-exchange technology has been known for a great number of years. Ion-exchange resins are typically synthetic, insoluble, cross-linked polymers carrying acidic or basic side groups. They have high exchange capacities and can be used for an almost unlimited number of reactions. Ion-exchange resins are used in water-treatment, extraction, separation, analysis and catalysis.

Ion-exchange resins have an extended, open molecular framework that includes electrically charged ionic groups. A cation exchanger exchanges positive ions and therefore has negative ions built into its framework. An anion exchanger has positive ions in its framework. The ions of the lattice are called the fixed ions; the smaller ions of opposite charge that can change places with ions in the solution are called counterions.

Common problems encountered with ion exchange processes conducted on proteins include poor protein recovery (i.e., protein adhered to the resin) and inability of the protein slurry to pass through the resin bed resulting in a high pressure drop across the resin bed. The process which is disclosed herein fulfills the need in the nutritional industry for a source of plant protein that has highly reduced levels of isoflavones, manganese and nucleotides is economical, provides good protein recovery and can be used on a commercial scale.

U.S. Pat. No. 5,352,384 to Shen discloses a process to produce an isoflavone enriched vegetable protein fiber. This patent discloses the use of a glucosidase to convert the glucone isoflavones (i.e., daidzen) in a protein slurry to the aglucone isoflavones. The fiber fraction is then recovered from the slurry by centrifugation to provide an aglucone enriched fiber.

An article by Ewan et al. in the *Journal of Food Science*, Vol. 57, No. 2, 1992 entitled: "Isoflavone Aglucones and Volatile Organic Compounds in Soybeans; Effects of Soaking Treatments", discloses the beneficial effects of soaking soybeans in mildly alkaline $NaHCO_3$ solutions at elevated temperatures, for manufacturing soymilk with improved flavor. This publication does not suggest or disclose the use of an ion-exchange resin to remove isoflavones, manganese and nucleic acids from plant protein.

In an article published in volume 47 (1982) of the Journal of Food Science, pp. 933–940, by J. How and C. Morr entitled "Removal of Phenolic Compounds from Soy Protein Extracts Using Activated Carbon", they report subjecting soy protein extracts to activated carbon and ion exchange process treatments to remove phenolic compounds that have been reported as being responsible for adverse color and flavor characteristics of soy protein products. Protein extracts were subjected to a two stage, sequential ion exchange treatment prior to protein precipitation. The protein extract was pumped "down-flow" through a cation exchange column in the Na+form and then an anion exchanger in the hydroxyl and chloride form to remove polyvalent anions including phenolic acids, phytate and others.

U.S. Pat. No. 5,248,804 to Nardelli et al. discloses a process for the removal of phytate from plant protein using ion-exchange resins. The process uses a macroporous anion exchange resin (weak base or strong base) which has been conditioned by 1) conversion to the hydroxide form; 2) conversion to the chloride or sulfate form; and 3) thereafter conversion of the strong base sites to the carbonate form and the weak base sites to the free base form. The plant protein containing phytate is then contacted with the treated resin to remove the phytate. The teachings of U.S. Pat. No. 5,248,804 are herein incorporated by reference.

Phytate comprises the salts of phytic acid. Phytic acid is also known as inositol hexaphosphate. Thus, in using an anion exchange resin, the highly anionic phosphate groups provide the handle by which the resin can extract the phytate from the protein slurry. In contrast, isoflavones and nucleotides are neutral molecules and would not be expected to attach to the resin or exchange with the anions on the resin.

U.S. Pat. No. 5,492,899 to Masor et al. discloses an infant formula with ribo-nucleotides. This patent teaches the use of certain levels and ratios of nucleotide equivalents in infant formulas and discloses an analytical technique to identify and quantify the nucleotide equivalents in a nutritional matrix. As used herein and in the claims of this invention, the term "nucleotide" is the same as the term "nucleotide equivalent" as defined in U.S. Pat. No. 5,492,899. U.S. Pat. No. 5,492,899 defines nucleotide equivalents as polymeric RNA, ribo-nucleosides, ribo-nucleosides containing adducts and mono-, di- and triphosphate ribonucleotides. The teachings of U.S. Pat. No. 5,392,899 are herein incorporated by reference.

The present invention comprises a method through which low isoflavone, low manganese or low nucleotide plant proteins can be manufactured. The invention further comprises the low isoflavone, low manganese and low nucleotides protein isolates themselves and to such protein isolates that are produced according to the method of the present invention. The present invention further comprises nutritional products made with the protein isolates produced in accordance with the invention. This, and other aspects of the invention are specifically described in detail in the description set forth below.

SUMMARY OF THE INVENTION

In its broadest application, the present invention relates to a method of reducing the isoflavone, manganese or nucleotide content of a plant protein comprising:

a) providing at least one anion exchange resin;

b) providing a slurry of plant protein that contains isoflavones, manganese or nucleotides;

c) contacting said slurry with said anion exchange resin; and d) separating said slurry with reduced content of isoflavones, manganese or nucleotides from said anion exchange resin.

Representative counterions useful in the anion exchange resin according to this invention, include acetate, citrate, chloride, bisulfate, carbonate and bicarbonate. As most anion exchange resins are supplied in the chloride form, it is possible to use such chloride resins directly without pretreatment. As discussed below, a preferred procedure for resin pretreatment washes the chloride resin with caustic to clean the resin, then a HCl wash is conducted to clean and control microbial growth and then the resin is converted to the carbonate and/or bicarbonate form.

In the production of plant protein using the process according to this invention, the anion that is released from the resin as a result of entrapping the isoflavone, manganese or nucleotide is important to the quality of the finished product. That is to say, the resulting protein should not be denatured, contain unacceptable levels of free hydroxyl groups or other offensive anions (i.e., chloride) that would produce a protein product that would be unacceptable for use in a nutritional product. For example, typical soy protein isolate contains sufficient levels of isoflavones, manganese and nucleotides that treatment with an anion exchange resin that has chloride as the counterion would produce a resulting protein that has excessive levels of chloride. In similar fashion, if the counterion is hydroxyl, the resulting product would need to be treated with acid to neutralize the basic product, thus unacceptably increasing the mineral load associated with the protein.

In one preferred embodiment of this invention, the anion exchange resin uses a counterion, such as carbonate or bicarbonate, which avoids the aforementioned problems. As used in the specification and in the appended claims, the term "carbonate" means carbonate and bicarbonate.

There is disclosed a method of reducing the isoflavone, manganese or nucleotide content of plant protein comprising:

a) providing at least one anion exchange resin containing strong base sites and weak base sites, said anion exchange resin prior to step b), being subjected to the steps comprising:
 i) conversion to a hydroxide form;
 ii) conversion to a chloride or sulfate form; and
 iii) conversion of at least some of said strong base sites to the carbonate form and at least some of said weak base sites to the free base form;
b) providing a slurry of plant protein;
c) contacting said slurry with said anion exchange resin; and
d) separating said slurry with reduced content of isoflavones, manganese or nucleotides from said anion exchange resin.

There is further disclosed a method for separating compounds selected from isoflavone, manganese or nucleotides from a plant protein slurry, said method comprising the steps of:

a) selecting an anion exchange resin;
b) exposing the resin to an agent that places on the resin an exchangeable anion that:
 i) does not change the pH of the protein slurry outside the range of 6.0 to 9.5; and
 ii) does not add an objectionable anion to the effluent protein slurry at step d);
c) providing a slurry containing a source of plant protein and at least one compound selected from isoflavone, manganese and nucleotides;
d) bringing the resin into contact with the resin; and
e) separating the slurry from the resin.

The present invention also relates to the protein that results from the process described herein. The protein product or isolate according to this invention is characterized in that it contains less than 30 $\mu$g of isoflavones per g of protein, less than 450 $\mu$g of manganese per g of protein and less than 10 mg of nucleotides per g of protein. The present invention further relates to a plant protein composition which comprises less than 30 $\mu$g of isoflavones per g of plant protein and to nutritional products comprising said protein.

There is also disclosed infant formulas that are based on plant protein and contain less than 600 $\mu$g of isoflavones per liter of ready-to-feed formula, more preferably less than 200 $\mu$g and most preferably less than 100 $\mu$g.

DETAILED DESCRIPTION

Typically, the method of this invention is conducted by placing the anion exchange resin in a bed, column or reactor through which the protein slurry is passed. The bed, column or reactor has at least one inlet and at least one outlet and is preferably operated as a vertical column in the "upflow" mode. In another embodiment, the preconditioned resin may be added to a tank containing the protein slurry and after an appropriate period of time for the reaction to take place, the resin is filtered from the slurry.

The anion exchange resin is typically a macroporous resin and is preferably a Type I or II macroporous resin. In a preferred embodiment, the anion exchange resin is selected from weak base anion exchange resins, strong base anion exchange resins and mixtures thereof. Representative of the anion exchange resins useful in the present invention include Amberlite® RA95, IRA-910 and IRA-900 sold by Rohm and Haas Company, Dowex-22 and MSA-1 sold by Dow Chemical and Purolite A510 and A500 sold by Purolite Company. As used herein and in the claims, the term resin is meant to include gels, which those skilled in the art would understand to be useful in the process described herein. Representative of such gels are Amberlite® IRA 410 (Type II gel, strong base anion) sold by Rohm and Haas Company, IRA 402 is a Type I strong base anion exchange gel that is not macroporous that would also be useful.

The proteins that may be used in the method of this invention include any plant protein that contains detectable levels of isoflavones, manganese and nucleotides. More specifically, the protein is obtainable from soybeans, corn, wheat, peas, beans, cottonseed, peanuts, carrots, alfalfa, apples, barley, bluegrass, clovers, coffee, garlic, hops, marijuana, oats, algae, orchard grass, parsley, rice, rye, sage, sesame, yeast, fungus, potatoes, hydrolyzates thereof and mixtures thereof.

It is preferred that the protein be a protein isolate or concentrate wherein the levels of fats, oils and carbohydrates have been reduced. It has been determined that the presence of fats and oils reduces the efficiency of the inventive process.

The chemical agents useful in converting the resin to the hydroxide form include sodium hydroxide, calcium hydroxide, potassium hydroxide and magnesium hydroxide. The most preferred agent is sodium hydroxide.

The chemical agents useful in converting the resin to the chloride or sulfate form include hydrochloric acid, sulfuric acid and sodium chloride. The preferred agent is hydrochloric acid.

The chemical agents useful in converting the resin to the carbonate or free base form include any of the weak base salts such as sodium carbonate, sodium bicarbonate and ammonium hydroxide. Sodium bicarbonate is the most preferred agent as it produces a protein effluent at a pH range of 6.6–9.5.

Those skilled in the art of ion exchange technology will appreciate that the protein slurry containing the isoflavones, manganese or nucleotides, as it is contacted with the anion exchange resin, should be at a pH that does not denature the protein, which causes clogging of the column. Further, adjustment of the pH past neutral, will add significant levels of anions to the slurry which will compete for counterion sites. Typically, a pH of from about 5.5 to 10 is satisfactory. Preferably, the pH of the protein slurry feed can range from 6.0 to 8.0. The pH of the protein slurry effluent (leaving the column or bed) should be near the pH at which the protein will be used in a final product. Thus, if a plant protein treated in accordance with this invention is to be used in an infant formula, the effluent pH should be about 6.0 to 7.5. In a preferred embodiment, the plant protein feed to the resin should be as free of added anions (i.e., —OH, Cl—, and the like) as possible. The addition of acids, bases, salts and the like to the protein slurry feed decreases the efficiency of the column to remove the isoflavones, manganese or nucleotides from the protein slurry.

As those skilled in the art will appreciate, exchange resins have a finite capacity and may be regenerated to an active state after exhaustion or near exhaustion. Thus, as contemplated in this invention, the exchange resins after contact with the plant protein is regenerated or reconditioned through known steps to the anionic form or more preferably through the steps comprising:

1) stripping the resin of any residue (i.e., protein) and conversion to the hydroxide form, for example through the use of sodium hydroxide;
2) conversion of the resin to the chloride or sulfate form; and
3) conversion of the strong base sites on the resin to the carbonate form and conversion of the weak base sites to the free base form.

Those skilled in the ion exchange resin art will appreciate that non-aqueous and alcohol water regenerations can be used.

One preferred embodiment of the method according to the present invention includes the step of homogenizing the plant protein slurry prior to contact with the resin. Homogenization or treatments similar thereto have been found in the process of this invention, to increase the effective removal of isoflavones, manganese and nucleotides from the slurry. In addition, homogenization of the protein slurry prior to contact with the resin reduces the pressure drop across the resin bed or column which facilitates the facile and economic production of a plant protein for use in nutritional products.

The present invention is also directed to a plant protein isolate that has specified levels of isoflavones and to a plant protein that has been subjected to the process disclosed herein and to nutritional products that are made from such proteins. Also contemplated herein are animal feeds that are substantially free of isoflavones. More specifically, the present invention relates to a plant protein containing less than about 30 μg of isoflavones per g of protein, less than about 450 μg of manganese and less than about 10 mg of nucleotide equivalents per gram of protein. In a more preferred embodiment, the protein is derived from soy beans and contains less than 20 μg isoflavone per gm of protein. In a most preferred embodiment, the plant protein contains less than 10 μg isoflavone per gm of protein, less than 5 mg of nucleotides per gm of protein and less than 200 μg of manganese per g of protein.

The following Examples describe specific, but non-limiting, embodiments of the present invention. The features of the present invention which are believed to be novel are set forth with particularity in the appended claims and should be understood as to structure and manner of operation by the following detailed Examples.

EXAMPLE 1

The process according to the present invention was used to produce a total of 221 kg (487 lbs.) of low isoflavone, low manganese and low nucleotide content soy isolate powder that was used in the manufacture of an infant formula. A total of six (6) manufacturing runs were required to produce the required soy protein isolate. A substantial amount of experimentation was conducted on a 50 liter scale to result in the best mode, described herein.

The soy protein starting material used in this Example was obtained from Archer Daniels Midland, Inc. (ADM) of Decatur, Ill., in curd form. The curd or protein slurry was of the commercially available soy protein isolate product known as Ardex F®. In a typical commercial process, soy proteins are extracted at slightly alkaline pH from defatted soy flake or defatted soy flour. The protein fraction is then precipitated from the extract by adjusting the pH to the isoelectric point of the proteins (pH 3.8 to 6.0). As most of the proteins are insoluble at this pH, a curd forms and the protein curd can be separated from the soluble sugars, salts, etc., by centrifugation. To complete the purification, the protein curd is washed with water at least once at this isoelectric pH, then the protein is spray-dried either as is or after resuspension at a neutral pH. In the following experiments, ADM supplied the isoelectric curd at 10 to 14% total solids and at a pH of about 4.5.

The supplied soy curd was diluted to about 6.5% total solids with water and placed into steam jacketed kettles. Each batch of the protein-in-water slurries weighed about 908 kg (2000 lbs.). The slurry was then heated to about 49° C. (120° F.) and neutralized to a pH of 6.8 with NaOH. The slurry was then filtered through a 60 mesh strainer, UHTST (ultra high temperature short time) processed and homogenized. The UHTST steam injection was at 152° C. (305° F.) and held for 10 seconds. It was determined that UHTST treatment post anion exchange exposure produces a protein with undesirable organoleptic properties. The slurry was then cooled to 55° C. (130° F.) and homogenized at 6895 kPa (1000 psig). The slurry was then transferred to the ion exchange system.

One aspect of the present invention resides in the discovery that ultra high temperature short time (UHTST) treatments need to be conducted prior to contact of the slurry with the resin to prevent spoilage of the slurry during the extended processing times. The process is conducted at temperatures where rapid microbiological growth can occur. Representative of the UHTST conditions useful in the present invention are temperatures from 120° C. (250° F.) to 155° C. (3 10° F.) and times of 1 to 60 seconds. The lower temperatures are associated with the longer hold times. This UHTST treatment, prior to the slurry contacting with the resin, provides microbiological stability while minimizing nutrient degradation.

The ion exchange system comprised a stainless steel, rubber lined column having inlet and outlet ports and a height of 401 cm (13'2") and a diameter of 30.5 cm (12 inch). 70 liters of Amberlite® IRA-910 anion exchange resin from the Rohm and Haas Co. of Philadelphia, Pa. was placed in the column. IRA-9 10 is a macroreticular strongly basic anion exchange resin. The basicity of this resin is derived from quaternary ammonium functionality with slightly lower basic strength than a Type 1 anion exchange resin. This resin is supplied in the chloride form and is approved by the United States Food and Drug Administration (FDA) (after condition cycling) for use in processing edible products.

Prior to contact with the protein curd, the resin was preconditioned. The resin was preconditioned through contact in an upflow mode with 6% by weight NaOH at a flow rate of 4.6 to 5.7 liters (1.2 to 1.5 gal) per minute for 30 minutes. The resin bed was then washed with deionized water for 10 to 15 minutes in the upflow mode. The resin was then contacted with 1.0% by weight HCl in a downflow mode at 16 liters per minute. The resin was then washed with deionized water in the downflow mode for about 30 minutes. 2.8 kgs (6.18 lbs) of sodium bicarbonate was added to about 196 liters (49 gals) of water and agitated to dissolve. This solution was then pumped to the column in a downflow mode at about 4 liters per minute. The bed was again rinsed with deionized water until the conductivity of the effluent was 300 μmhos or less. The resin bed was then backwashed to remove air and re-classify the resin. The resin bed was allowed to settle naturally and the water was drained from the column. The column was now ready for the service cycle after draining the water to the top of the resin bed.

The protein slurry was pumped upflow through the ion exchange column at a flow rate of 3.6 to 3.8 kgs (8 to 8.4 lbs.) per minute. The inlet temperature of the slurry was 55–60° C. (130–140° F.) and the contact time was about 20 minutes minimum. Protein slurry exiting the column was cooled, samples were taken and then spray dried using conventional techniques and equipment.

The column before the next batch was regenerated with 6% NaOH, 1% HCl and 1.5% NaHCO$_3$ (sodium bicarbonate) as described above for the initial preparation of the resin bed. All solutions were prepared with deionized water.

Results

A total of six batches were manufactured to yield a total of about 221 kgs of ion exchanged soy isolate powder. Three (3) samples were taken at various times during the processing of each batch: 1) protein slurry fed to the ion exchange column; 2) effluent from the column; and 3) dried powder. The samples were analyzed for mineral profiles of sodium, potassium, phosphorus, chlorine, calcium, magnesium, manganese, aluminum and fluoride. The samples were also analyzed for isoflavones and nucleotides. In order to make comparisons between the liquids and the powders possible, the concentration of the powder was normalized to 6½% total solids.

Mean levels and standard deviations for each analyte before and after ion exchange were calculated for the six runs. The results are set forth in Table I. Note that reduction is expressed as a positive value while a negative value represents an increase in analyte concentration.

TABLE I

Mineral Profile

| Mineral | Reduction % |
| --- | --- |
| Phosphorus | 73.3 ± 3.4 |
| Calcium | 16.5 ± 4.2 |
| Magnesium | 11.4 ± 5.1 |
| Sodium | −6.3 ± 3.9 |
| Potassium | −7 ± 21 |
| Manganese | 31 ± 10 |
| Aluminum | 6 ± 15 |
| Chloride | −270 ± 110 |
| Fluoride | 48 ± 29 |

The most significant reduction in concentration from the ion exchange treatment was observed in total phosphorus, flouride and manganese. The reduction in phosphorus in consistent with the teachings of U.S. Pat. No. 5,2478,804 as a large portion of the phosphorus inherent in soy exists as a phytate salt. In contrast, the effluent showed a significant increase in chloride. This is consistent with the fact that HCl is one of the regenerants used after the caustic rinse and the strong base resin has some weak base sites.

The profiles of calcium, magnesium, manganese, fluoride and aluminum before and after treatment showed a decrease. Of this group, manganese showed a significant decrease (31±10%). Surprisingly, when compared to the other multivalent metals, aluminum (+3 charge) remained essentially unchanged. Further, the removal of calcium and magnesium can be explained as the adsorption or chelation with phytate.

The monovalent cations, sodium and potassium, were relatively unaffected by the ion exchange treatment (−6.3±3.9% and −7±21%, respectively). The negative values actually indicate a slight uptake in both sodium and potassium. These data support the typical behavior of an anion exchange resin in that monovalent cations would not be exchanged or adsorbed by the anionic resin.

An important benefit of the instant inventive process is that high levels of protein are recovered from the treated plant protein isolates. This means that very little protein is lost in the resin column or bed. In these experiments, over 90% of the protein that entered the resin column was recovered in the effluent.

It is important to note that the overall efficiency of the process of this invention is improved when solubility and homogenity of the protein slurry is enhanced. Thus, the pre-filtration (through a 60 mesh filter) and homogenization greatly reduced the pressure drop across the column, which increased the efficiency of the inventive process. In comparison, the process without the pre-filtering and homogenization resulted in an initial pressure drop of about 138 kPa (20 psig) while the pre-filtering and homogenization resulted in an initial pressure drop of about 14 to 35 kPa (2–5 psig). After about 4 to 6 hours of operation without prefiltering and homogenization, the pressure drops of 276 to 414 kPa (40–60 psig) were experienced while with prefiltering and homogenization, pressure drops were about 55 to 83 kPa (8–12 psig).

The process of this invention was also very effective in removing nucleotides. The analytical procedures used are described in U.S. Pat. No. 5,492,899 to Masor et al. The removal of total potentially available nucleotides (TPAN) was found to be about 57.4±7.2%.

The isoflavones were almost completely removed by the present inventive process. Table II sets forth the specific isoflavones, the level of the feed slurry, level in the effluent and level in the powder.

TABLE II

| | | | | REDUCTION % | |
| --- | --- | --- | --- | --- | --- |
| ISOFLAVONE | FEED μg/g* | EFFLUENT μg/g* | POWDER μg/g* | FEED VS. POWDER | FEED VS. EFFLUENT |
| Daidzin | 4.12 ± 0.87 | 0.51 ± 0.21 | 0.68 ± 0.37 | 83.5 ± 6.8 | 87.6 |
| Genistin | 10.0 ± 2.8 | 0.82 ± 0.55 | 0.87 ± 0.72 | 91.4 ± 5.9 | 91.8 |
| Daidzein | 3.9 ± 6.5 | 0.10 ± 0.0 | 0.10 ± 0.0 | 97.4 ± 4.3 | 97.4 |
| Genistein | 3.7 ± 1.4 | 0.10 ± 0.0 | 0.10 ± 0.0 | 97.3 ± 1.4 | 97.3 |

*normalized to a 6.5 wt % solution

EXAMPLE II

Nutritional Product Using Low Isoflavone Soy Protein

The soy protein produced in Example I was used to produce an infant formula. A control product and the infant formula according to this invention were then analyzed for isoflavone content. The procedure used to produce the experimental and control products was that described in U.S. Pat. No. 5,021,245 to Borschel et al. except that the fiber was omitted. The teachings of U.S. Pat. No. 5,021,245 are herein incorporated by reference.

Typically, plant protein based infant formulas contain 1.5 to 2.0 wt % protein as fed (ready-to-feed). A preferred embodiment is 1.6 to 1.8 wt % protein as fed. Thus, as described below, an infant formula made with a plant protein treated in accordance with this invention will have an isoflavone content of less than 600 µg/liter of formula. (30 µg of isoflavone per g of protein x 20 gms protein per liter of formula (RTF)=600 µg if isoflavone per liter of RTF formnula). A more preferred infant formula according to this invention will contain less than 200 µg of isoflavones per liter of RTF formula and most preferably less than 100 µg of isoflavones per liter of RTF formula.

A further aspect of the invention is directed to a soy protein containing 43.6 micrograms of isoflavone per gram of protein in which said isoflavones are selected from the group consisting of daidzin, genistin, daidzein, and genistein. An additional aspect of the invention is directed to an infant formula containing 1092 micrograms, or less, of isoflavone per liter of formula in which said isoflavones are selected from the group consisting of daidzin, genistin, daidzein and genistein. A further aspect of the invention is directed to a formula containing 1526 micrograms or less, of isoflavone per liter of formula in which said isoflavones are selected from the group consisting of daidzin, genistin, daidzein, and genistein.

An HPLC (high pressure liquid chromatography) method was used to quantitate the major soy isoflavones (genistin, daidzin, genistein and daidzein) using a method adapted from the following three (3) articles which are herein incorporated by reference.

1) Setchell, K D R and Welch, M B *J. Chrom.* 386 (1987) 315–323
2) Wang, G., Kuian, S S, Francis, O J, Ware, G M, and Corman, A S *J. Agric. Food Chem.* 38 (1990) 185–190
3) Barnes, S., Kirk M., and Coward, L. *J. Agric. Food. Chem.* 42 (1994) 2466–2474

Samples of the ready-to-feed experimental and control infant formula were obtained and 20 ml of each was weighed into a tared 250 ml round bottom flask. 80 ml of ethyl alcohol was then added and the mixture was stirred. A condenser was attached to the flask and the samples were refluxed at 80° C. for 2 hours. The mixtures were then cooled to room temperature and quantitatively transferred to a 100 ml volumetric flask. The precipitate and the flask were rinsed with 15 ml of 80% alcohol (v/v). The volumetric flasks were brought to volume with 80% alcohol and the samples were then mixed well. The samples were filtered through Whatman No. 41 paper and then 15 ml of each filtrate was placed into a graduated conical 15 ml stoppered glass test tube. Each tube was placed in a warm water bath and a stream of nitrogen was used to evaporate each sample to 3 ml. The tubes were then cooled to room temperature and 1 ml of methanol was added to each tube and then diluted to 10 ml with water and mixed well. 1.5 ml of each sample was then filtered through a 0.45 µm polypropylene membrane into an HPLC autosampler vial. Test analysis for isoflavones using reverse phase HPLC was conducted with the HPLC system as follows:

| Column | Vydac C18 Pharmaceutical; 250 x 4.6 mm; 5 µm |
|---|---|
| Detection | UV absorbance at 254/280 nm |
| Injection | 50 mcL |
| Temperature | ambient |
| Flow Rate | 0.8 ml/min |
| Run Time | 120 minutes |
| Eluant A | 950 volumes water; 50 volumes $CH_3CN$; 1 volume trifloroacetic acid (TFA) |
| Eluant B | 400 volumes water; 600 volumes $CH_3CN$; 1 volume TFA |

Gradient Program:

| Time (minutes) | 0 | 5 | 95 | 100 | 102 | 120 |
|---|---|---|---|---|---|---|
| % Eluant B | 0 | 0 | 60 | 100 | 100 | 0 |

The results of the test are set forth in Table III

TABLE III

| Soy Isoflavones | Control µg/g | Experimental µg/g* |
|---|---|---|
| Daidzin | 11.6 | <1.0 |
| Daidzein | 1.0 | <1.0 |
| Genistin | 19.4 | <1.0 |
| Genistein | 2.2 | <1.0 |
| TOTAL | 34.2 | <1.0 N/A |

*At detection limit.

This indicates that the process of the invention can be used to produce a nutritional product that has greatly reduced levels of isoflavones.

These nutritional products include infant formula, said formula comprising: 1) protein, said protein being of a concentration of between 10 and 25 grams per liter of formula; 2) fat, said fat being of a concentration of between 20 and 45 grams per liter; and 3) carbohydrates, said carbohydrates being of a concentration of between 60 and 110 grams per liter of formula. Preferably, the protein has as its source soy protein isolate, or sodium and calcium caseinates or a blend thereof; said fat has as its source soy, coconut or corn oil, or another vegetable oil or a blend thereof; and said carbohydrates have as their source, sucrose, corn syrup, glucose polymers, or other carbohydrates, or a blend thereof.

The pediatric nutritional formula of this invention is preferably prepared using the following method. An appropriate quantity of protein is dispersed in sufficient water to solubilize it, thereby forming a protein solution. Typically this protein source would be soy protein isolate. A carbohydrate source such as one or more of corn syrup solids, maltodextrins, and sucrose is dissolved in water, thereby forming a carbohydrate solution. Appropriate minerals are dissolved in water, so as to form a mineral solution. Once formed the solutions (protein, carbohydrate, and mineral) are combined in appropriate quantities with vegetable oils and oil soluble vitamins. The resulting solution is then heat processed and homogenized. Following processing, water soluble vitamins are added. The solution is then diluted with water to the appropriate caloric density, approximately 670–725 kcal per liter of formula. The formula is then dispensed into containers and retorted to obtain commercial sterility. As prepared, the formula contains appropriate nutrients in compliance with the Infant Formula Act as of the date of this application. It should also be recognized that the unique formula of this invention could be prepared for use in powdered form or as a concentrated liquid.

A further aspect of this invention is directed to an enteral formula comprising protein, said protein being of a concentration of from 10 to 35 grams per liter; fat, said fat being of a concentration of from 20–45 grams per liter; and carbohydrates, said carbohydrates being of a concentration of from 60–110 grams per liter.

EXAMPLE III

Tolerance Study

At the time of filing this application, a clinical study of the physiological effects of plant estrogens or isoflavones in inflant formula was underway. Prior to this extensive study, a smaller tolerance study was conducted to assess overall tolerance of reduced isoflavone soy formulas in healthy, term infants.

The tolerance study was a randomized, double-masked, 3 week study using 145 healthy infants 2 to 5 weeks of age. Infants were fed a standard milk-based formula for a 1 week baseline period and then fed for 2 weeks a standard soy formula, a low phytate soy isolate based formula with isoflavones, a hydrolyzed soy isolate based formula with reduced phytate and isoflavones or a formula using the protein produced in Example I. The primary outcome variables were stool characteristics, formula intake and incidence of spit up and vomiting. Secondary variables were weight gain and parental responses to a feeding tolerance questionnaire.

Formula intake and incidence of spit up and vomit did not differ among the groups at baseline or during the study period. Mean stool rank consistency was softer for infants fed the hydrolyzed formula compared to the other experimentals. Parents associated watery and more frequent stools with the hydrolyzed formula. Infants fed the formula using the protein produced in Example I evidenced less constipation than at baseline. Mean weight gains were similar for all study groups. The conclusion of this study was that removal of phytate and/or isoflavones from the soy based formula had minimal impact of tolerance.

Industrial Applicability

The process disclosed in this invention is a very effective, inexpensive and reliable method for the commercial removal of isoflavones, manganese and nucleotides from plant proteins. The process produces a plant protein that has highly desirable characteristics such as isoflavone content of less than 30 $\mu$g/g protein, less than 450 $\mu$g manganese per g of protein and less than 10 mg nucleotides per g of protein. The protein resulting from treatment with the process described herein also has better flavor (less beany taste), improved color (lighter) and improved functionality (i.e., ability to form a stable emulsion).

Commercial scale use of the process of this invention is enhanced when the protein slurry is pre-filtered and homogenized prior to contact with the resin bed. Macroporous resins in the bicarbonate form are most preferably used.

As a result of the present inventor's advancement to the state of the art, the nutritional industry will now be able to economically produce products containing reduced levels of isoflavones, manganese and nucleotides. Lastly, humans and animals consuming products produced according to this invention will benefit from the avoidance of certain noxious elements contained in plant proteins.

While certain representative embodiments and details have been presented for the purpose of illustrating the invention, it will be apparent to those skilled in the art that various changes and modifications may be made therein without departing from the spirit or scope of the invention.

We claim:

1. An infant formula comprising soy protein, carbohydrates, fats, vitamins, and minerals wherein said infant formula contains less that 600 micrograms of isoflavones per liter of ready-to-feed formula.

2. The infant formula according to claim 1 wherein said formula contains less than 200 $\mu$g of isoflavones per liter of ready-to-feed formulas.

3. The infant formula according to claim 2 wherein said formula contains less than 100 $\mu$g of isoflavones per liter of ready-to-feed formulas.

4. An infant formula comprising:
   a) soy protein, said protein being of a concentration of between 10 and 25 grams per liter of formula;
   b) a source of carbohydrate;
   c) a source of fat;
   d) a source of minerals;
   e) a source of vitamins, and;
   f) said infant formula contains less than 600 micrograms of isoflavones per liter of formula.

5. The infant formula according to claim 4 in which said protein is soy protein isolate.

6. The infant formula according to claim 4 in which said carbohydrate is present at a level of between 60 and 110 grams per liter.

7. The infant formula according to claim 6 in which said carbohydrate source comprises at least one of corn syrup solids, maltodextrins, glucose polymers, or sucrose.

8. The infant formula according to claim 4 in which said fat is present at a level of between 20 and 45 grams per liter of formula.

9. The infant formula according to claim 8 in which said fat source comprises at least one of soy oil, coconut oil, or corn oil.

10. The infant formula according to any one of claims 4, 5, 6, 7, 8, or 9 in which said isoflavone is present at a concentration of less than 200 micrograms of isoflavones per liter of said formula.

11. The infant formula according to anyone of claims 4, 5, 6, 7, 8, or 9 in which said isoflavone is present at a concentration of less than 100 micrograms of isoflavones per liter of said formula.

12. The infant formula according to anyone of claims 4, 5, 6, 7, 8 or 9, in which said infant formula has a caloric density of approximately 670–725 kcal per liter of said formula.

13. The infant formula according to claim 4 which is in the form of a powdered composition which is diluted prior to ingestion by said infant.

14. The infant formula according to claim 4 which is in the form of a concentrated liquid that is diluted prior to ingestion by said infant.

15. An enteral formula comprising:
   a) soy protein, said protein being of a concentration of between 10 and 35 grams per liter of formula;
   b) optionally a source of carbohydrate;
   c) optionally a source of fat; and
   e) said enteral formula contains less than 600 micrograms of isoflavones per liter of formula.

16. The enteral formula according to claim 15 in which said protein is soy protein isolate.

17. The enteral formula according to claim 15 in which said carbohydrate is present at a level of between 60 and 110 grams per liter.

18. The enteral formula according to claim 17 in which said carbohydrate source comprises at least one of corn syrup solids, maltodextrins, glucose polymers, or sucrose.

19. The enteral formula according to claim 15 in which said fat is present at a level of between 20 and 45 grams per liter of formula.

20. The enteral formula according to claim 19 in which said fat comprises at least one of soy oil, coconut oil, or corn oil.

21. The enteral formula according to any one of claims 15, 16, 17 18, 19, or 20 in which said isoflavone is present at a concentration of less than 200 micrograms of isoflavones per liter of said formula.

22. The enteral formula according to any one of claims 15, 16, 17, 18, 19, or 20 in which said isoflavone is present at a concentration of less than 100 μg micrograms of isoflavones per liter of said formula.

23. A formula comprising:
   a) soy protein, said protein being of a concentration of between 10 and 25 grams per liter of formula;
   b) a source of carbohydrate;
   c) a source of fat;
   d) a source of minerals;
   e) a source of vitamins, and;
   f) said formula contains 1092 micrograms, or less, of isoflavones per liter of formula, in which said isoflavones are selected from the group consisting of daidzin, genistin, daidzein, and genistein.

24. The formula according to claim 23 in which said carbohydrate is present at a level of between 60 and 110 grams per liter.

25. The formula according to claim 24 in which said carbohydrate source comprises at least one of corn syrup solids, maltodextrins, glucose polymers, or sucrose.

26. The formula according to claim 23 in which said fat is present at a level of between 20 and 45 grams per liter of formula.

27. The formula according to claim 26 in which said fat source comprises at least one of soy oil, coconut oil, or corn oil.

28. The formula according to claim 23 in which said formula has a caloric density of approximately 670–725 kcal per liter of said formula.

29. The formula according to claim 23 which is in the form of a powdered composition which is diluted prior to ingestion.

30. The formula according to claim 23 which is in the form of a concentrated liquid that is diluted prior to ingestion.

31. The formula according to claim 23 in which said protein is soy protein isolate.

32. An enteral formula comprising:
   a) soy protein, said protein being of a concentration of between 10 and 35 grams per liter of formula;
   b) optionally a source of carbohydrate;
   c) optionally a source of fat; and
   e) said enteral formula contains 1526 micrograms, or less, of isoflavones per liter of formula in which said isoflavones are selected from the group consisting of daidzin, genistin, daidzein, and genistein.

33. The enteral formula according to claim 32 in which said protein is soy protein isolate.

34. The enteral formula according to claim 32 in which said carbohydrate is present at a level of between 60 and 110 grams per liter.

35. The enteral formula according to claim 34 in which said carbohydrate source comprises at least one of corn syrup solids, maltodextrins, glucose polymers, or sucrose.

36. The enteral formula according to claim 32 in which said fat is present at a level of between 20 and 45 grams per liter of formula.

37. The enteral formula according to claim 36 in which said fat comprises at least one of soy oil, coconut oil, or corn oil.

38. The formula according to claim 32 in which said formula has a caloric density of approximately 670–725 kcal per liter of said formula.

39. The formula according to claim 32 which is in the form of a powdered composition which is diluted prior to ingestion.

40. The formula according to claim 32 which is in the form of a concentrated liquid that is diluted prior to ingestion.

* * * * *